United States Patent
Weng et al.

(10) Patent No.: US 8,295,133 B2
(45) Date of Patent: Oct. 23, 2012

(54) OPTIC DISC WRITER DEVICE

(75) Inventors: Mao Huai Weng, Taipei Hsien (TW);
Chun Sung Wu, Taipei Hsien (TW);
Wen Chu Chuang, Taipei Hsien (TW)

(73) Assignee: Acard Technology Corp., Sanchung (TW)

( * ) Notice: Subject to any disclaimer, the term of this patent is extended or adjusted under 35 U.S.C. 154(b) by 0 days.

(21) Appl. No.: 12/955,044

(22) Filed: Nov. 29, 2010

(65) Prior Publication Data

US 2011/0305130 A1 Dec. 15, 2011

(30) Foreign Application Priority Data

Jun. 15, 2010 (TW) ................................ 99211437 U

(51) Int. Cl.
*G11B 17/22* (2006.01)
(52) U.S. Cl. .................. 369/30.57; 369/30.55
(58) Field of Classification Search ............... 369/30.32, 369/30.34, 30.36, 30.42, 30.45, 30.55, 30.57; 347/171
See application file for complete search history.

(56) References Cited

U.S. PATENT DOCUMENTS

| | | | | |
|---|---|---|---|---|
| 5,734,629 A * | 3/1998 | Lee et al. | ................... | 369/30.34 |
| 6,400,659 B1 * | 6/2002 | Kitaoka | ..................... | 369/34.01 |
| 2003/0222928 A1 * | 12/2003 | Cummins et al. | ................. | 347/2 |
| 2005/0157605 A1 * | 7/2005 | Lilland et al. | .............. | 369/30.36 |
| 2008/0123482 A1 * | 5/2008 | Otsuka et al. | ................ | 369/47.1 |
| 2009/0262609 A1 * | 10/2009 | Ebina et al. | ................ | 369/30.45 |
| 2009/0279394 A1 * | 11/2009 | Maeshima et al. | ......... | 369/30.32 |
| 2010/0072689 A1 * | 3/2010 | Toshima et al. | .............. | 271/3.14 |
| 2010/0214608 A1 * | 8/2010 | Maeshima et al. | ........... | 358/1.15 |

* cited by examiner

*Primary Examiner* — Thang Tran
(74) *Attorney, Agent, or Firm* — Rabin & Berdo, P.C.

(57) ABSTRACT

An optic disc writer device is an embedded type independent system. It has a host controller, a disc writer assembly, and a printer assembly. The disc writer assembly is electrically connected to the host controller and has a robotic arm, at least one disc writer, and an optic disc deposition zone. The robotic arm is operated to move to the optic disc deposition zone for picking and/or depositing an optic disc and to move the optic disc to the disc writer by which a writing operation is performed on the disc to provide a writing-completed disc. The printer assembly is electrically connected to the host controller. The printer assembly includes a disc tray that is controlled by the host controller for extension and withdrawal for receiving the writing-completed disc therein. The printer assembly is operated to form printing of patterns on a surface of the writing-completed disc.

8 Claims, 6 Drawing Sheets

OPTIC DISC WRITER DEVICE

BACKGROUND OF THE INVENTION

1. Field of the Invention

The present invention is related to an optic disc writing/burning device, and more particular to an embedded arrangement of a combination of a host controller, a disc writer assembly, and a printer assembly featuring automatic disc loading/unloading and one-process operation of disc writing and printing, which is applicable to diverse models of optic disc writing/burning device or the likes.

2. Description of Related Art

A known optic disc writing/burning device is often composed of a host controller and a plurality of disc writers. The plurality of disc writers is operated in such a way that a source disc and at least one blank destination disc are manually deposited into corresponding disc writers first. Once the disc writing operation is done, another process of printing data or labeling on a surface of the writing-completed disc must be performed by positioning the writing-completed disc in a printer for carrying out the printing. Alternatively, manual sticking a separate label that carries pre-printed information or data to a surface of a writing-completed disc may be needed. Although these processes are effective in writing data to a blank destination disc and printing or sticking label to a surface of the disc, such processes of disc writing and disc surface printing are troublesome and time- and labor-consuming. Apparently, these processes are generally impractical for general consumers and do not meet the needs of the users.

SUMMARY OF THE INVENTION

Accordingly, the primary objective of the present invention is to provide an optic disc writer device, which comprises an embedded arrangement of a combination of host controller, a disc writer assembly, and a printer assembly, wherein a robotic arm is employed to pick up and deposit optic discs from and to a disc deposition zone for performance of disc writing and the printer assembly is operated to carry out printing of labeling patterns to a surface of a writing-completed disc, whereby advantages of automatic disc loading/unloading and one-process operation of disc writing and printing are realized, and overall practicability is thus enhanced.

The secondary objective of the present invention is to provide an optic disc writer device, which comprises a robotic arm and a disc deposition zone arranged in such a way that the robotic arm is operated to ascend/descend while rotating or to independently ascend/descend for picking up and depositing a optic disc, whereby easy operation is realized and the overall convenience is enhanced.

Another objective of the present invention is to provide an optic disc writer device, which comprises a disc deposition zone that defines a plurality of disc sites that each receive and collect a plurality of optic discs set therein, or that are alternatively classified for different purposes including for example a disc-to-be-written site, a writing-completed and printing-completed disc site, and writing-failed and printing-failed disc site, so that overall practicability and convenience are enhanced.

In order to achieve the foregoing objective, the present invention provides an optic disc writer device, comprising a host controller, a disc writer assembly, and a printer assembly. The disc writer assembly is electrically connected to the host controller. The disc writer assembly comprises a robotic arm, at least one disc writer, and an optic disc deposition zone. The robotic arm is operated to move to the optic disc deposition zone for picking and/or depositing an optic disc and to further convey the optic disc picked up thereby to the disc writer by which a writing operation is performed on the disc to provide a writing-completed disc. The printer assembly is electrically connected to the host controller. The printer assembly comprises a disc tray that is controlled by the host controller for extension and withdrawal for receiving the writing-completed disc to loaded therein. The printer assembly is operated to form printing of patterns on a surface of the writing-completed disc. As such, the present invention features automatic loading/unloading of discs and an integrated one-process operation of disc writing and printing, whereby overall practicability and convenience are enhanced.

BRIEF DESCRIPTION OF THE DRAWINGS

The present invention can be fully understood from the following detailed description and preferred embodiments with reference to the accompanying drawings, in which.

DETAILED DESCRIPTION OF THE PREFERRED EMBODIMENTS

Figure 1:
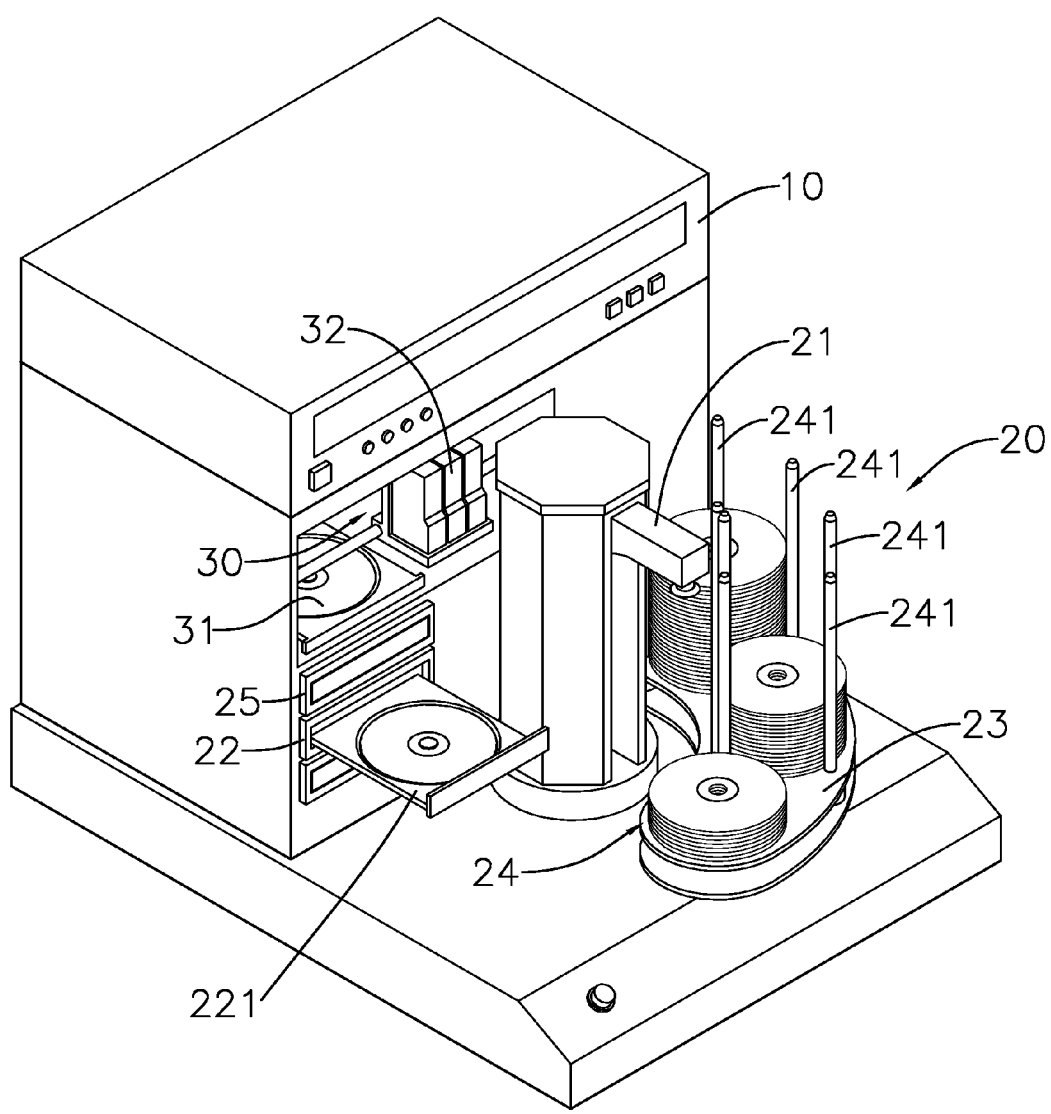
FIG. 1 is a perspective view showing an embodiment according to the present invention.
Figure 2:
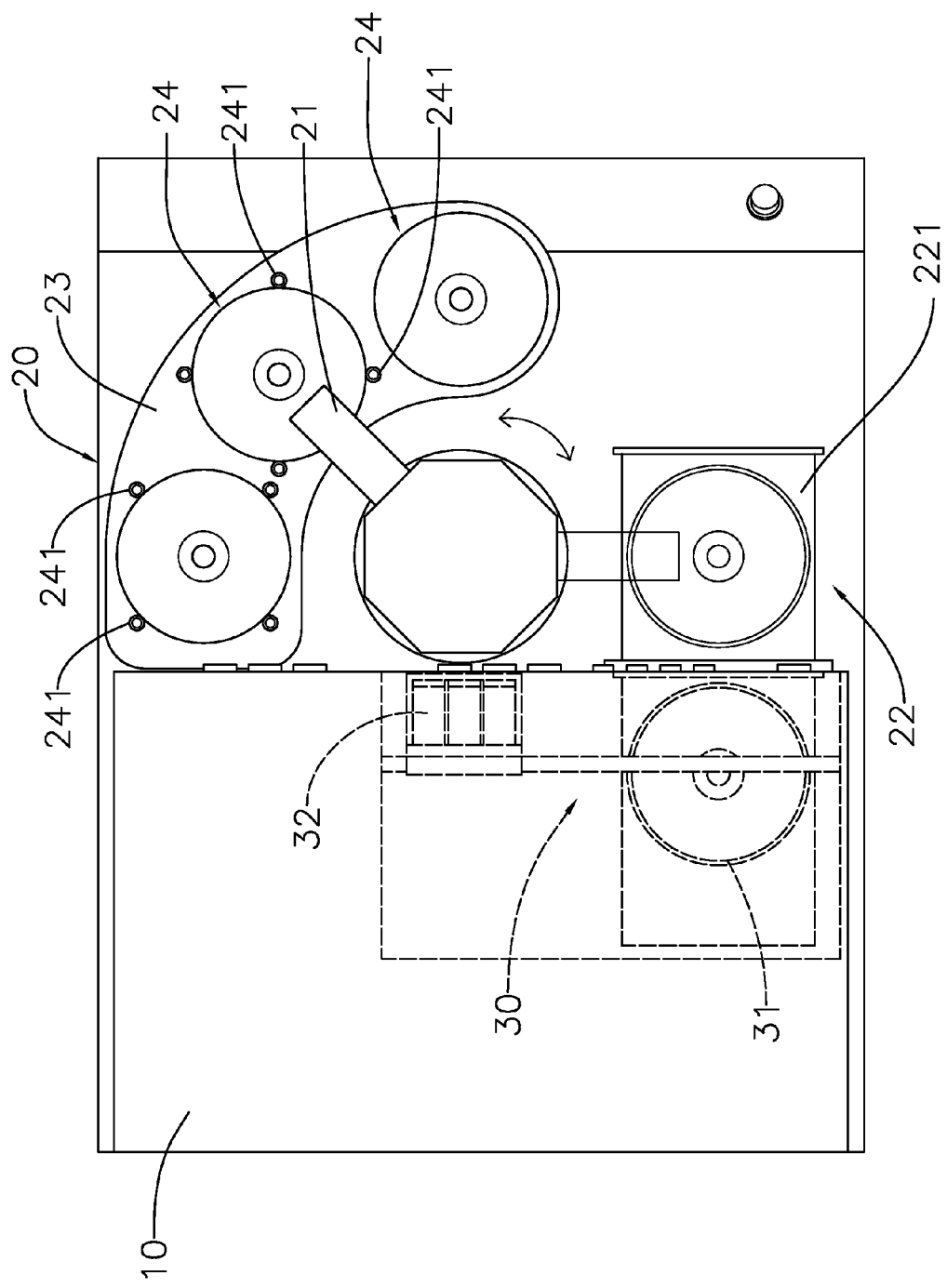
FIG. 2 is a top plan view illustrating an operation of a disc writer unit of the embodiment according to the present invention.
Figure 3:
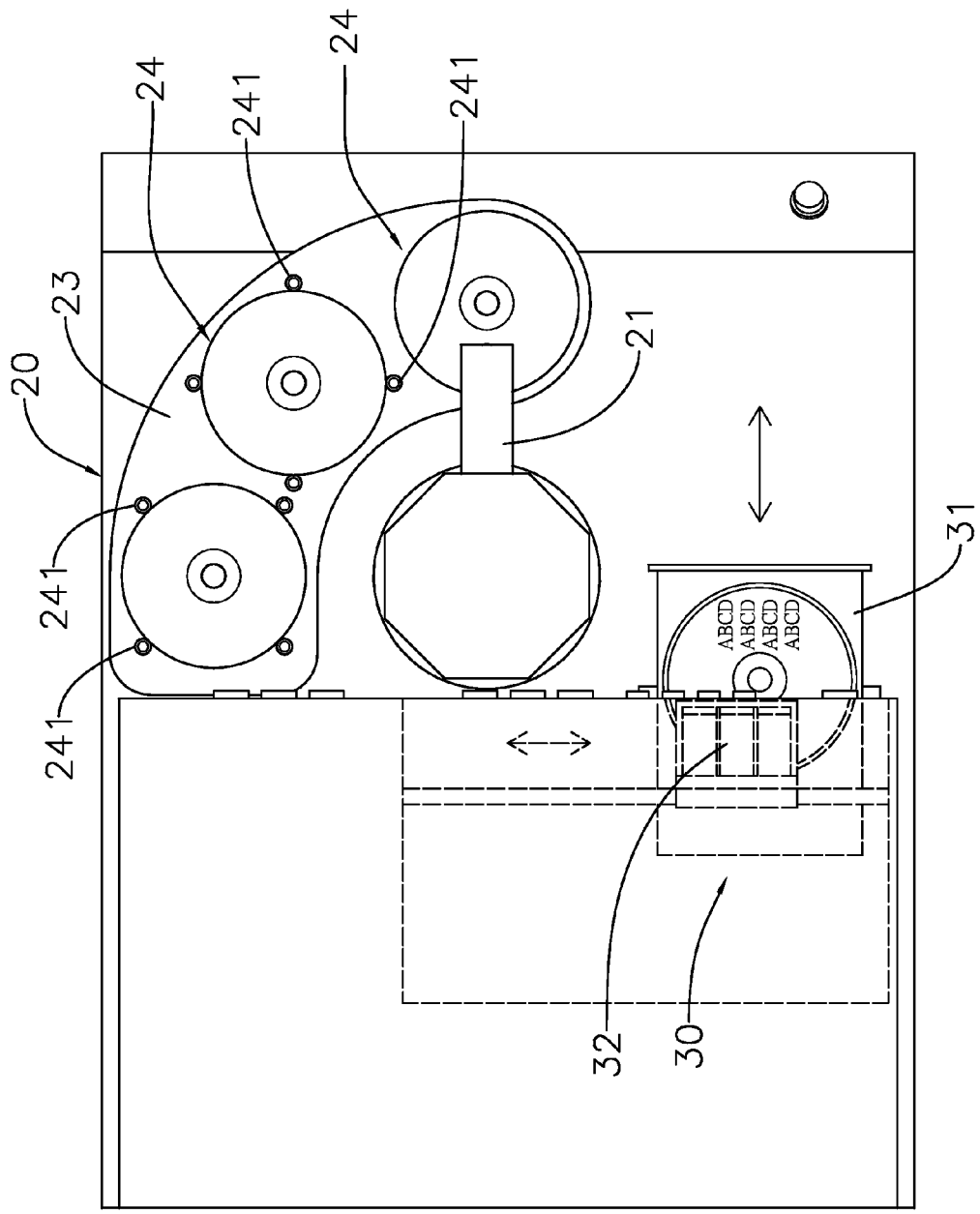
FIG. 3 is a top plan view illustrating an operation of a printer unit of the embodiment according to the present invention.
Figure 4:
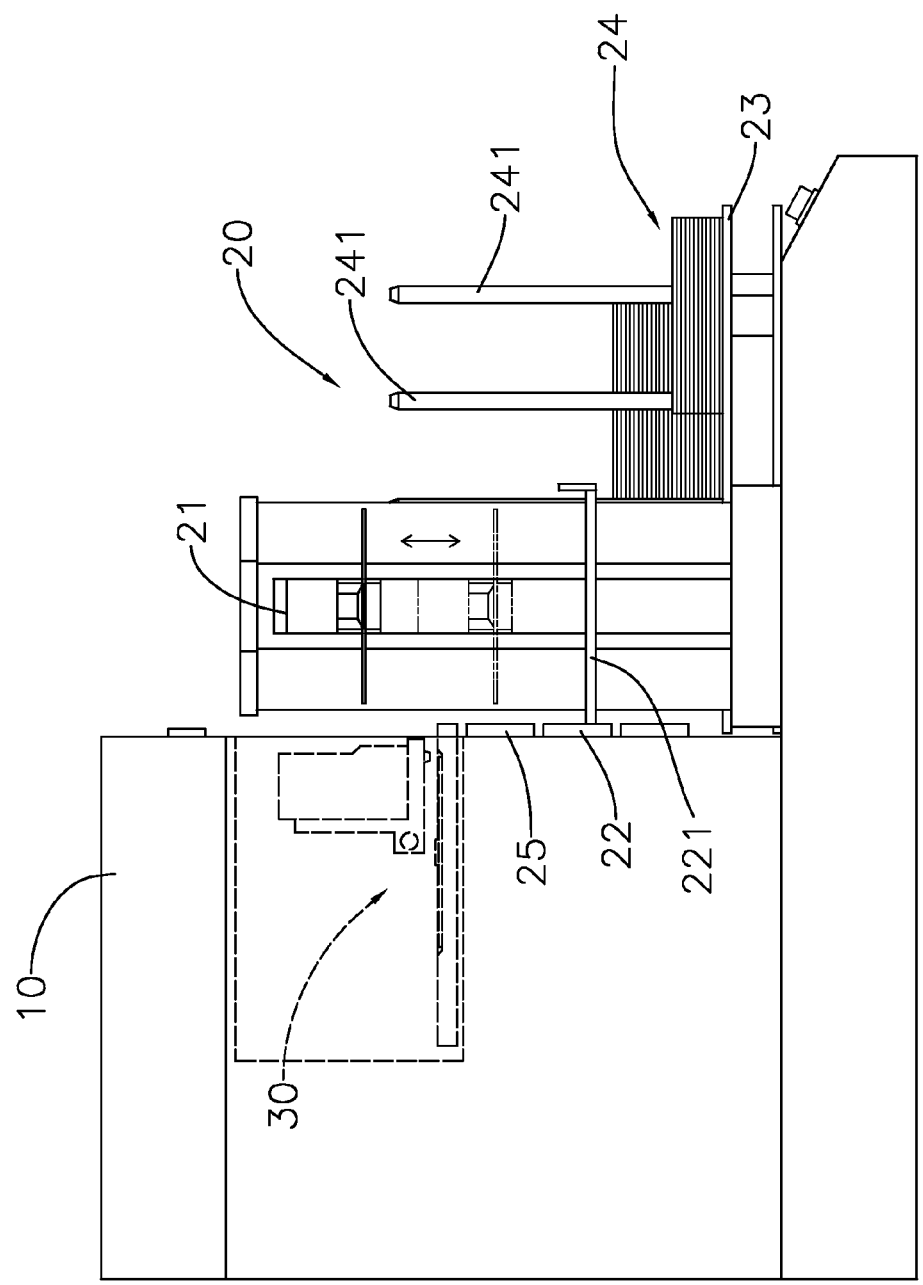
FIG. 4 is a side elevational view illustrating the operation of the disc writer unit of the embodiment according to the present invention.
Figure 5:
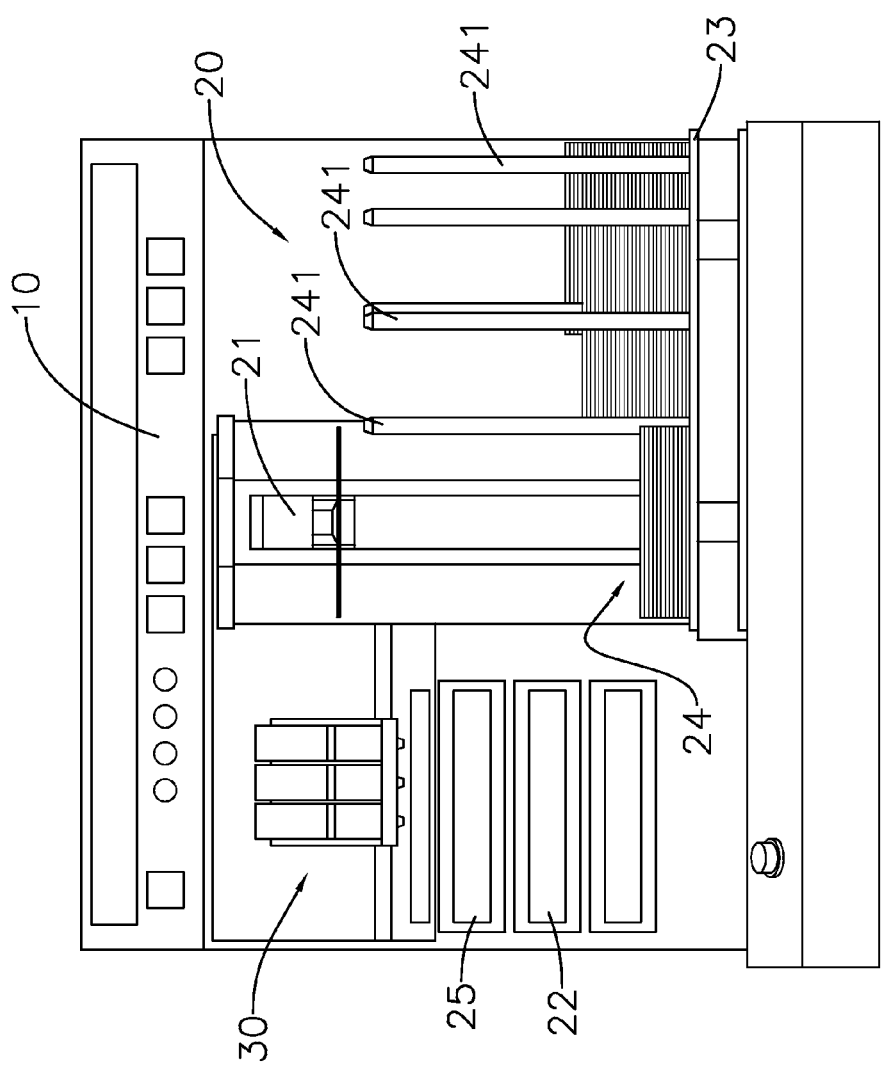
FIG. 5 is a front view of the embodiment according to the present invention.

With reference to the drawings and in particular to FIGS. 1-6, the present invention provides an optic disc writer device, which is constructed as an independent embedded system, comprising a host controller 10, a disc writer assembly 20, and a printer assembly 30. The disc writer assembly 20 is electrically connected to the host controller 10 and the disc writer assembly 20 comprises a robotic arm 21, at least one disc writer 22, and an optic disc deposition zone 23. The robotic arm 21 is operated to selectively move to the optic disc deposition zone 23 for picking up and depositing optic discs and conveying an optic disc picked up thereby to the disc writer 22 for writing of the disc. The printer assembly 30 is electrically connected to the host controller 10 and the printer assembly 30 comprises a disc tray 31, which is controlled by the host controller 10 to extend/withdraw and is for receiving an optic disc of which a writing operation has been completed. The printer assembly 30 is operated to form printing of patterns on a surface of the writing-completed disc. As such, the present invention features automatic loading/unloading of discs and an integrated one-process operation of disc writing and printing.

The host controller 10 further comprises a storage device 11, which is set in signal communication with the at least one disc writer 22 of the disc writer assembly 20. The storage device 11 stored therein data to be written to optic discs. The storage device 11 of the host controller 10 may selectively comprise a hard disk drive (HDD), a solid-state drive (SSD), a read-only memory (ROM), and/or a flash memory. The optic disc deposition zone 23 is arranged below the robotic arm 21 and preferably comprises a turn table on which a plurality of disc sites 24 is defined for receiving and collecting optic disc thereon. With the rotation of the turn table, the robotic arm 21, which is operated to selectively ascend and/or descend, may access and pick up/deposit an optic disc. Alternatively, the optic disc deposition zone 23 is set beside the robotic arm 21, and the optic disc deposition zone 23 defines a plurality of disc sites 24 for receiving and collecting optic discs. The robotic arm 21 is operated to selectively ascend and/or descend in a rotatable manner for accessing and picking up/depositing optic discs. The disc writer assembly 20 may further comprise a compact-disc read-only memory (CD-ROM) 25, which is set in signal communication with the disc writer 22 for operation of direct duplication of disc data. The plurality of disc sites 24 of the optic disc deposition zone 23 is each provided with a plurality of retention stalks 241 for retaining optic discs on the disc sites 24. The printer assembly 30 may comprises an ink jet printer 32, which ejects ink dots in a matrix form to form printing of patterns on a surface of an optic disc. Alternatively, the printer assembly 30 may comprise a LightScribe burner, which uses a laser beam to burn patterns on a surface of an optic disc. Further alternatively, the printer assembly 30 may adopt dye sublimation operation to form printing of patterns on a surface of an optic disc.

The above arrangement forms an optic disc writer device. As shown in FIGS. 1-6, the features of the present invention are that a combination of a host controller 10, a disc writer assembly 20, and a printer assembly 30 is provided and the disc writer assembly 20 comprises at least one disc writer 22 and an optic disc deposition zone 23 arranged beside a robotic arm 21. The optic disc deposition zone 23 defines thereon a plurality of disc sites 24 for receiving and collecting optic discs on the disc sites 24, and the plurality of disc sites 24 of the optic disc deposition zone 23 are provided with a plurality of retention stalks 241, which retain the optic discs on the disc sites 24, whereby the robotic arm 21 is operated to ascend/descent with respect to the optic disc deposition zone 23 to pick up an optic disc therefrom and the robotic arm 21 is further operated to rotate to a location beside the disc writer 22 to load the optic disc into the disc writer 22 by which a writing operation is carried out on the disc. Besides the at least one disc writer 22, the disc writer assembly 20 may further comprise a CD-ROM 25 or other disc reading/writing device, such as a DVD, a DVD/CD-RW, a DVD±RW, and a CD-RW. The CD-ROM 25 is in signal communication with the disc writer 22 for direct duplication of disc data. After a writing operation of a disc has been completed with the disc writer 22, the disc tray 221 of the disc writer 22 extends to allow the robotic arm 21 to pick up the writing-completed disc and to further transfer the disc into a disc tray 31 of the printer assembly 30 that is controlled by the host controller 10 for extension and withdrawal. Through the operation of the printer assembly 30, patterns can be printed on a surface of the writing-completed disc. The printer assembly 30 may comprises an ink jet printer 32 or a LightScribe burner (not shown), so as to print patterns on a surface of the optic disc through a matrix of ink dots or laser beam burning. Alternatively, the printing of patterns on the surface of the optic disc can be performed in different ways (such as dye sublimation). Once the printing of the surface of the optic disc is completed, the robotic arm 21 picks up the writing-completed and printing-completed optic disc and deposits the disc to the optic disc deposition zone 23, wherein the plurality of disc sites 24 defined in the optic disc deposition zone 23 are preferably classified for different purposes, including for example a disc-to-be-written site, a writing-completed and printing-completed disc site, and writing-failed and printing-failed disc site. In this way, identical process of disc writing and printing operation can be repeated to realize excellent result of disc writing and printing through an integrated one-process operation.

Figure 6:
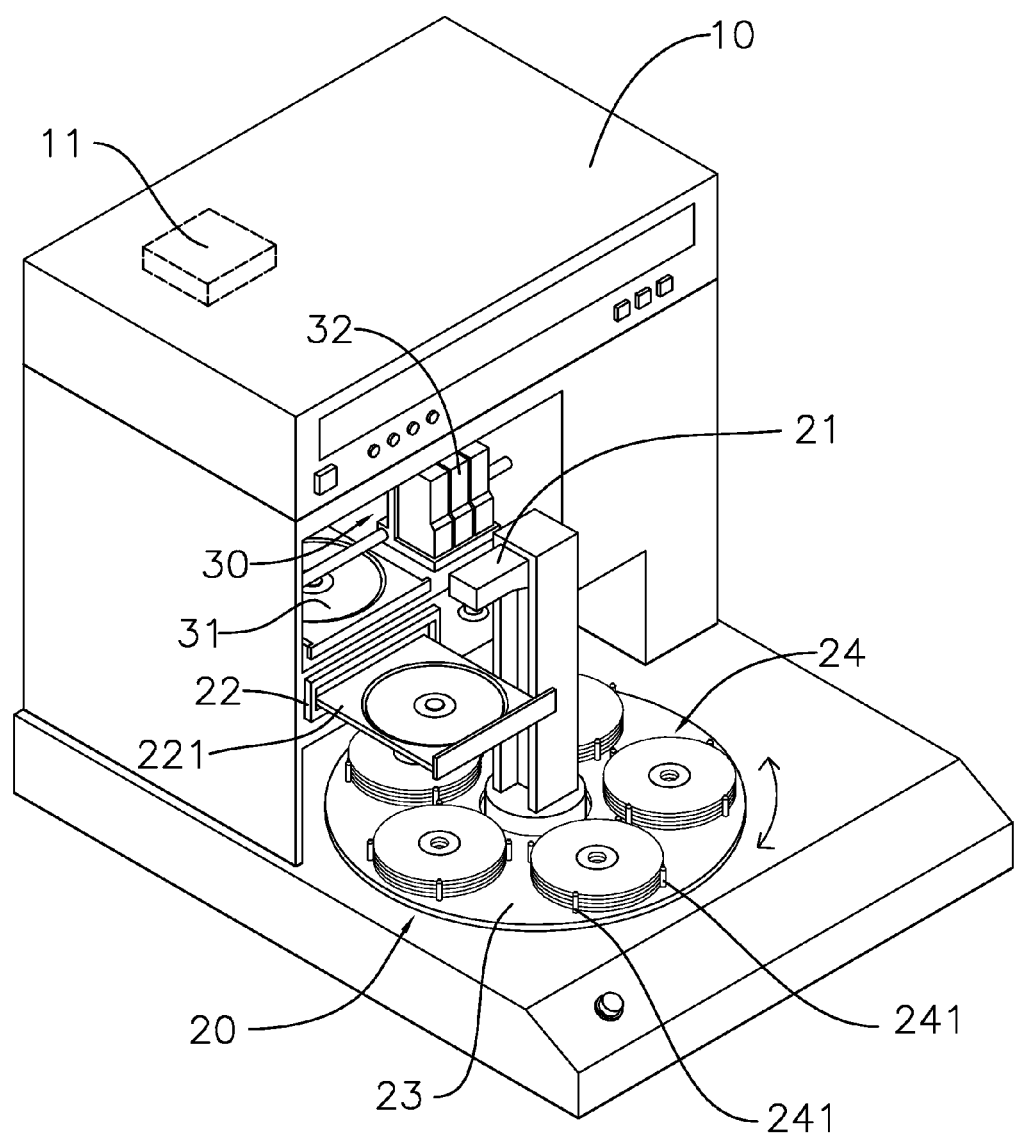
FIG. 6 is perspective view showing another embodiment according to the present invention.

As another embodiment according to the present invention (as shown in FIG. 6), the optic disc deposition zone 23 is alternatively set below the robotic arm 21, and the optic disc deposition zone 23 comprises a turn table, which defines thereon a plurality of disc sites 24 for receiving and collecting optic discs. The plurality of disc sites 24 defined in the optic disc deposition zone 23 are preferably classified for different purposes, including for example a disc-to-be-written site, a writing-completed and printing-completed disc site, and writing-failed and printing-failed disc site. The turn table is selectively set into rotation as controlled by the host controller 10, whereby the turn table can be rotated to an angular position corresponding to a desired one of the disc sites 24, whereby the robotic arm 21 may, through simple ascending/descending movement, pick up an optic disc from the desired disc site 24. The robotic arm 21 is further operated to load the optic disc picked up thereby into the disc writer 22, by which a writing operation is carried out on the disc. The disc writer 22 is in signal communication with the storage device 11 of the host controller 10 to retrieve data that are to be written to the optic disc from the storage device 11. The storage device 11 may selectively comprise a hard disk drive (HDD), a solid-state drive (SSD), a read-only memory (ROM), and/or a flash memory. After a writing operation of a disc has been completed with the disc writer 22, the disc tray 221 of the disc writer 22 extends to allow the robotic arm 21 to pick up the writing-completed disc and to further transfer the disc into a disc tray 31 of the printer assembly 30 that is controlled by the host controller 10 for extension and withdrawal. Through the operation of the printer assembly 30, patterns can be printed on a surface of the writing-completed disc. The printer assembly 30 may comprises an ink jet printer 32 or a LightScribe burner (not shown), so as to print patterns on a surface of the optic disc through a matrix of ink dots or laser beam burning. Alternatively, the printing of patterns on the surface of the optic disc can be performed in different ways (such as dye sublimation). Once the printing of the surface of the optic disc is completed, the robotic arm 21 picks up the writing-completed and printing-completed optic disc and deposits the disc to the optic disc deposition zone 23 to have the disc set on a writing-completed and printing-completed disc site. It is apparent that the disc sites 24 can be arranged in different ways and forms to facilitate a desired operation of disc writing/burning.

What is claimed is:

1. An optic disc writer device, which is an embedded type independent system, comprises:
   a host controller;
   a disc writer assembly, which is electrically connected to the host controller and comprises a robotic arm, at least one disc writer, and an optic disc deposition zone, the robotic arm being operable to move to the optic disc deposition zone for picking up and depositing an optic disc and conveying the optic disc to one of the at least one disc writer for writing data to the disc so as to provide a writing-completed disc,
   wherein the optic disc deposition zone is arranged below the robotic arm and comprises a turn table, which defines a plurality of disc sites thereon for receiving and collecting optic discs, the turn table being rotatable to allow the robotic arm to pick up and deposit optic discs through ascending and descending movements of the robotic arm, the turn table having an outer perimeter that forms a circle, the robotic arm being disposed in an aperture in the turn table formed at a center of the circle; and a printer assembly, which is electrically connected to the host controller and comprises a disc tray, which is controlled by the host controller for extension and withdrawal for receiving the writing-completed disc to be loaded therein, the printer assembly being operable to form printing of patterns on a surface of the writing-completed disc.

2. The optic disc writer device according to claim 1, wherein the host controller comprises a storage device, which is in signal communication with the at least one disc writer of the disc writer assembly and stores therein data to be written to an optic disc.

3. The optic disc writer device according to claim 2, wherein the storage device of the host controller comprises one of a hard disk drive (HDD), a solid-state drive (SSD), a read-only memory (ROM), and a flash memory.

4. The optic disc writer device according to claim 1, wherein the disc writer assembly comprises a compact-disc read-only memory (CD-ROM), which is in signal communication with the disc writer for direct duplication of disc data.

5. The optic disc writer device according to claim 3, wherein the plurality of disc sites of the optic disc deposition zone comprise a plurality of retention stalks that retain optic discs on the disc sites.

6. The optic disc writer device according to claim 1, wherein the printer assembly comprises an ink jet printer that forms printing of patterns on a surface of an optic disc through a matrix of ink dots.

7. The optic disc writer device according to claim 1, wherein the printer assembly comprises a LightScribe burner, which employs a laser beam to burn patterns on a surface of an optic disc.

8. The optic disc writer device according to claim 1, wherein the printer assembly uses a dye sublimation operation to form printing of patterns on a surface of an optic disc.

* * * * *